(12) United States Patent
Kaminsky et al.

(10) Patent No.: US 9,215,258 B2
(45) Date of Patent: *Dec. 15, 2015

(54) METHODS FOR MANAGING CONFERENCES

(75) Inventors: David Louis Kaminsky, Durham, NC (US); Malcolm William Kilmer, Durham, NC (US); David M. Ogle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 644 days.

This patent is subject to a terminal disclaimer.

(21) Appl. No.: 13/490,874

(22) Filed: Jun. 7, 2012

(65) Prior Publication Data

US 2012/0246234 A1    Sep. 27, 2012

Related U.S. Application Data

(63) Continuation of application No. 12/961,702, filed on Dec. 7, 2010.

(51) Int. Cl.
| | | |
|---|---|---|
| *H04L 12/28* | (2006.01) | |
| *H04L 29/06* | (2006.01) | |
| *H04L 12/18* | (2006.01) | |
| *H04J 1/16* | (2006.01) | |

(52) U.S. Cl.
CPC .......... *H04L 65/403* (2013.01); *H04L 12/1822* (2013.01)

(58) Field of Classification Search
USPC .......................................... 370/260, 252, 386
See application file for complete search history.

(56) References Cited

U.S. PATENT DOCUMENTS

| | | | |
|---|---|---|---|
| 7,567,662 B1 | 7/2009 | Renner et al. | |
| 8,175,241 B2 * | 5/2012 | Nguyen ................... | 379/202.01 |
| 8,456,507 B1 * | 6/2013 | Mallappa et al. .......... | 348/14.08 |
| 2004/0052218 A1 | 3/2004 | Knappe | |
| 2005/0271194 A1 | 12/2005 | Woods et al. | |
| 2008/0117839 A1 | 5/2008 | Raju et al. | |
| 2009/0147958 A1 | 6/2009 | Calcaterra et al. | |
| 2009/0214016 A1 | 8/2009 | O'Sullivan et al. | |
| 2009/0216835 A1 * | 8/2009 | Jain et al. ...................... | 709/204 |
| 2009/0319912 A1 | 12/2009 | Serr et al. | |
| 2011/0225247 A1 | 9/2011 | Anantharaman et al. | |
| 2011/0270922 A1 | 11/2011 | Jones et al. | |
| 2012/0110196 A1 | 5/2012 | Balasaygun et al. | |

OTHER PUBLICATIONS

Final Office Action in related U.S. Appl. No. 12/961,702, mailed on Nov. 4, 2013; 9 pages.

Non-Final Office Action in related U.S. Appl. No. 12/961,702, mailed on Apr. 2, 2013; 8 pages.

(Continued)

*Primary Examiner* — John Pezzlo

(74) *Attorney, Agent, or Firm* — Schmeiser, Olsen & Watts LLP

(57) ABSTRACT

Described is a method for administering an online conference. The method includes receiving an electronic communication from a conference participant. A group is determined to be associated with the conference participant. An action is performed on the conference participant based on the group association.

14 Claims, 7 Drawing Sheets

(56) References Cited

OTHER PUBLICATIONS

Alam, Mohammad Sabbir, et al., "Articulated Narrowcasting for Privacy and Awareness in Multimedia Conferencing Systems and Design for Implementation within a SIP Framework", Journal of Virtual Reality and Broadcasting, vol. 5, No. 14, 2008; 13 pages.

Non-Final Office Action in related U.S. Appl. No. 12/961,702, mailed on Sep. 24, 2014; 9 pages.

* cited by examiner

METHODS FOR MANAGING CONFERENCES

RELATED APPLICATION

This application is a continuation application of co-pending U.S. patent application Ser. No. 12/961,702, filed Dec. 7, 2010, and published as U.S. Publication No. US2012/0140681, entitled "Systems and Methods for Managing Conferences", the entirety of which is incorporated by reference herein.

FIELD OF THE INVENTION

The present invention relates generally to methods for managing conferences, and more specifically, to conference management methods that perform actions on conference participants according to group membership.

BACKGROUND

Conference management systems, also referred to as conference bridges, permit participants at different locations to communicate in real-time with each other in a video, audio, and/or web conference. Typically, each participant connects to the bridge, either by a special phone number that connects the participant to the conference bridge, or by the conference bridge placing a call to each participant. Conferences often include a moderator, who manages various aspects of the conference, such as adding and dropping participants, selecting participants to be seen or heard during the conference, and creating sub-conferences from the conference. Such actions are performed on a per-participant basis. For example, the moderator can select a speaker to "take the floor" without interruption by other participants by muting the other participants individually.

BRIEF SUMMARY

An embodiment features a computer-implemented method of administering an online conference. The conference management system receives an electronic communication from a conference participant. A group association is determined of the conference participant. It is determined whether an action is to be performed. The action is performed based on the group association of the conference participant.

Another embodiment features a computer-implemented method of administering an online conference. A conference management system receives an electronic communication from a first conference participant and a second conference participant. A first group is determined to be associated with the first conference participant. A second group is determined to be associated with the second conference participant. he first group has a higher priority status than the second group. an event is detected that includes the first and second conference participants. An action is performed on the first conference participant based on an association with the first group having the higher priority status.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

In brief overview, the conference management methods described herein manage one or more conferences according to group membership of the participants. A conference administrator can create one or more participant groups in the conference management system. Each group is populated with a list of conference participants, and with information pertaining to each participant, such as the participant's name, job title, and contact information. A group can be populated with participant information by the conference administrator, or can be added automatically by the conference management system, for example, by querying an external information source such as an information directory server or social network website. During a conference, actions can be directed against conference participants according to their group membership. For example, a conference administrator can select a group for muting, whereby all participants in the group are muted.

The moderator can also create a conference profile that limits the number of groups associated with conference participants to only those groups of interest to the moderator, for example, only those groups to which the moderator also belongs.

Conferences can also be managed either with moderator assistance or in an unattended mode, i.e., no moderator, in accordance with predefined rules, guidelines, or policies, For example, conference speakers can be prioritized according to a corporate policy, whereby when a company executive speaks during a company-wide conference call, all other participants are muted. Thus, when a vice president of the company and a non-executive employee speak at the same time during a conference call, the employee is muted, permitting the vice president to speak without interruption.

Figure 1:
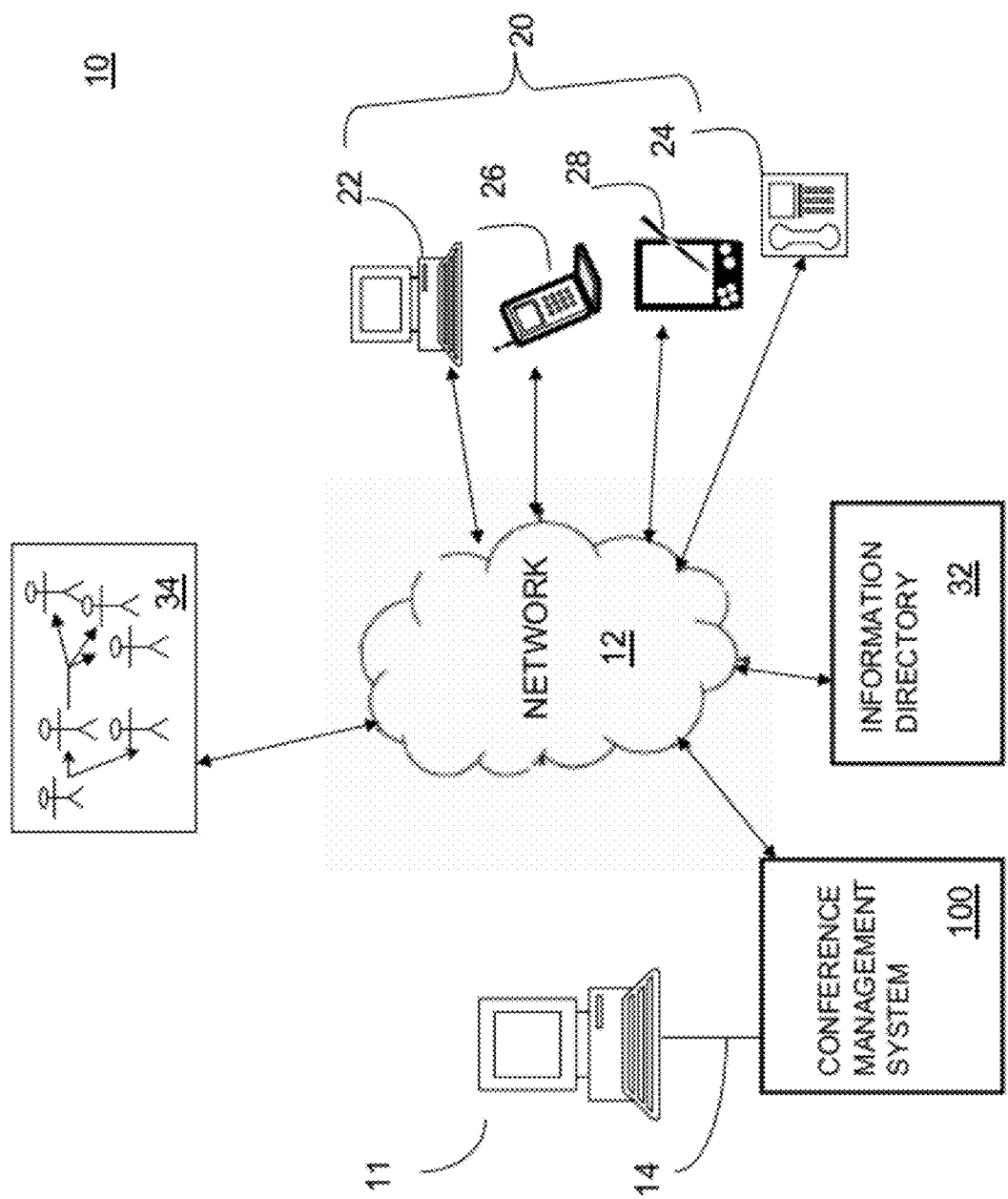
FIG. 1 is a network diagram illustrating an environment in which embodiments of the systems and methods can be applied.

FIG. 1 is a network diagram 10 illustrating an environment in which the systems and methods can be practiced.

Conference participants can access a conference management system 100 by employing various client devices 20, such as a computer 22, telephone 24, cell phone 26, and/or other mobile device 28, for example, a personal digital assistant (PDA) or handheld computer. The conference participants are geographically separate from each other, and can communicate with the conference management system 100 via an intervening network 12, for example, a public switched telephone network (PSTN), mobile communications network, data network, such as a local area network (LAN) or wide area network (WAN), or a combination thereof, or other communication networks known to those of ordinary skill in the art. The conference management system 100 and client devices 20 can transmit video, audio, data, or a combination thereof over the network 12 to each other. The conference management system 100 can also communicate with one or more information sources, such as a social network 34 or information directory 32 such as a Lightweight Directory Access Protocol (LDAP) directory.

A conference administrator 11 can be connected to the conference management system 100 by a desktop computer, laptop computer, server system, handheld device such as a personal digital assistant (PDA), a cellular phone, computer terminal, or other electronic device in communication with the conference management system 100. The conference administrator 11 can be connected to the conference management system 100 via a connection 14 known to those of ordinary skill in the art, for example, a standard telephone line, digital subscriber line, cable, LAN, WAN, broadband, or wireless connection. Alternatively, the conference administrator 11 can communicate with the conference management system 100 via the intervening network 12. The conference administrator 11 can be a conference participant, a system administrator, or other user.

Figure 2:
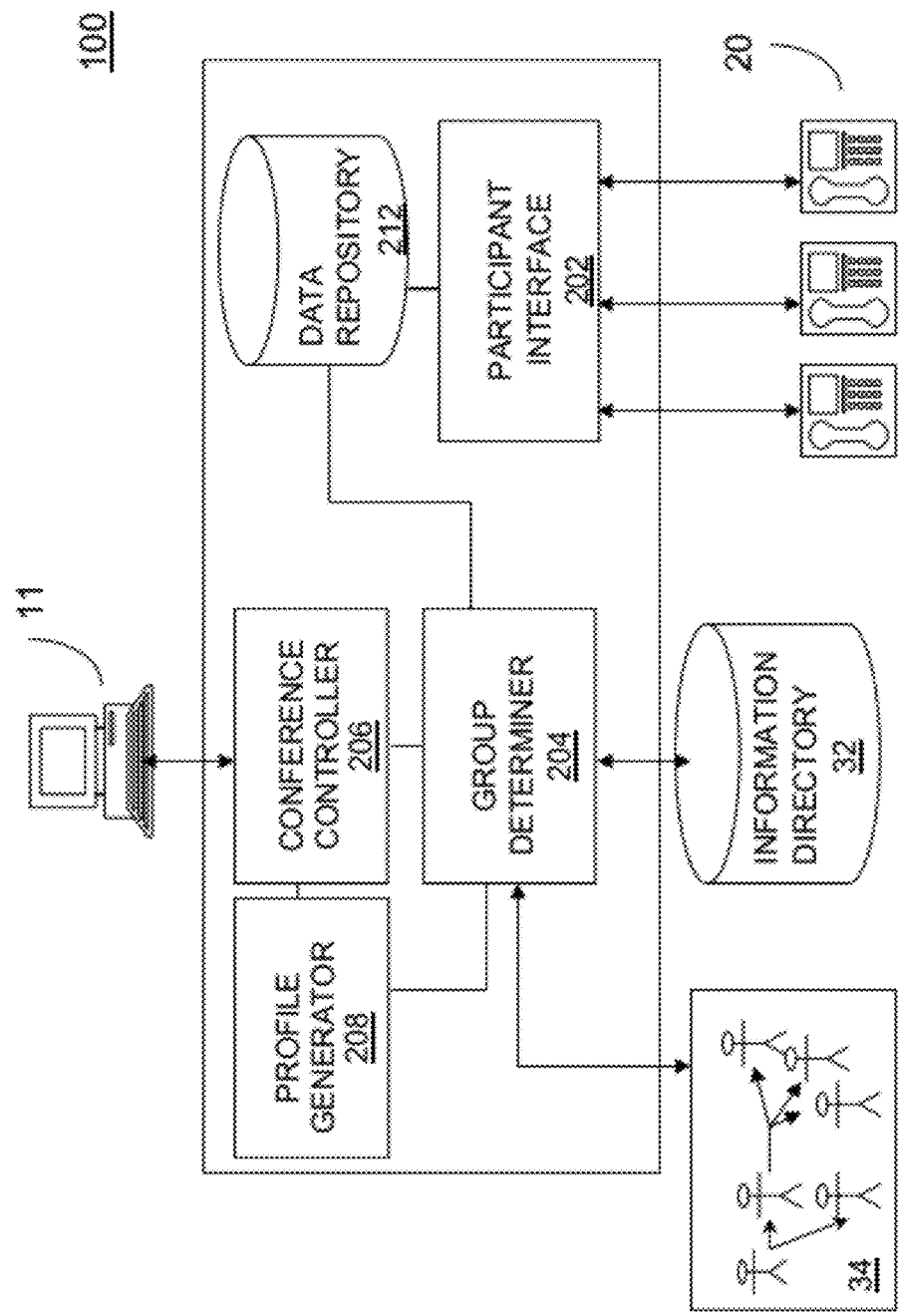
FIG. 2 is a block diagram of an embodiment of a conference management system.

FIG. 2 is a block diagram of one embodiment of the conference management system 100 of FIG. 1. The conference management system 100 can be configured for centralized conferencing, decentralized conferencing, full mesh conferencing, or multicast conferencing, or other conferencing configurations known to those of ordinary skill in the art. The conference management system 100 can be configured for operator-attended conferencing, where a conference administrator 11, also referred to as a moderator or operator, can create and/or schedule one or more concurrent conferences. The conference administrator 11 can also monitor a conference, performing functions known to those of ordinary skill in the art, such as muting participants, creating question and answer sessions, and responding to participant requests. Alternatively, the conference administrator 11 can create unattended conferences, such as an ad hoc conference, where no moderator is present during the conference.

The conference management system 100 generally includes a participant interface 202, a group determiner 204, a conference controller 206, and a profile manager 208. The participant interface 202 establishes a connection with each client device 20 so that the video, audio, and/or data streams from one client device 20 can be mixed together in accordance with well-known mixing techniques, and output to the other client devices 20. In this manner, each participant can hear, see, and/or exchange data with one or more other participants during a conference.

The participant interface 202 can include a network interface (not shown) that is connected to a network, for example, the intervening network 12 shown in FIG. 1. The network interface 202 can communicate with the network via any combination of hard-wired or wireless communication links, for example, a standard telephone line, digital subscriber line, LAN, WAN, e.g., T1, T3, broadband, wireless, or cellular connection.

A conference participant can establish a communication path between the participant's client device 20 and the conference management system 100. This can be accomplished for example by dialing a phone number corresponding to the conference management system 100 or by entering an internet uniform resource locator (URL) for accessing the conference management system 100. Alternatively, conference management system 100 can initiate a connection with the participant, for example, by dialing the participant's client device 20.

The group determiner 204 receives participant information and determines which, if any, group or groups are associated with the participants. The conference administrator 11 can use the group determiner 204 to create one or more groups, and place each conference participant into one or more of the groups when the participant joins the conference. Alternatively, the group determiner 204 can automatically add participants to a group as the participants join the conference.

The group determiner 204 can identify preexisting group associations with conference participants by querying an external information directory server 32, for example, a LDAP directory, or a Systems, Applications, and Products in Data Processing (SAP) directory, or human resource system. The group determiner 204 can also query other information sources such as a social network 34, for example, the Facebook® social network. If the query by the group determiner 204 identifies a group to which a participant belongs, the group association can be presented to the conference administrator 11.

When a conference administrator 11 creates a group, the group determiner 204 can validate a participant's association with the group by querying an abovementioned information source 32, 34 and identifying groups, or a subset of a group, associated with the participant. Groups retrieved from the query can be compared to the group created or referenced by the conference administrator 11 to determine whether the participant is added to the group. If so, the participant can be automatically added to the group created by the conference administrator 11.

The profile generator 208 generates a conference profile that can be used by the conference administrator 11 to select one or more groups of interest among the groups received from external information sources. This feature is particularly beneficial where conference participants are members of several groups, which may be unknown to the conference administrator 11.

For example, if an LDAP query determines that a participant is a member of a significant number of groups, the relationship data pertaining to the participant and each group can be presented to the conference administrator 11 The profile generator 208 can reduce the number of groups to only those groups which are of interest to the conference administrator 11. In doing so, the conference administrator 11 can create a conference profile to filter groups based on keywords, reporting hierarchy, participant location, relationship to the conference administrator, or other manner that is beneficial to the conference administrator 11 with regard to effectively administering the conference.

A conference profile can be created to comply with corporate policies or guidelines regarding conferencing etiquette. For example, a profile can be created that complies with a corporate policy establishing that when a vice president speaks during a conference call, the other participants are to be muted. Conference profiles can be stored in a data repository 212 for reuse by the conference administrator 11.

The profile generator 208 can create a conference profile for an unattended conference or ad hoc conference, which can establish a predetermined number of groups and default actions according to the profile groups. For example, when a company employee joins a conference with his peers and his manager, and an LDAP query produces irrelevant group associations, such as the employee's membership to the company softball league, the irrelevant group associations can be discarded by the conference profile, so that only relevant group associations, such as the employee's immediate organization, are used in the conference.

The conference controller 206 executes actions directed to groups, or participants based on group membership. For example, the conference controller 206 can mute all participants in a group in response to a request made by the conference administrator 11, or in response to a predetermined policy, which can be enforced by creating a conference profile.

Figure 3:
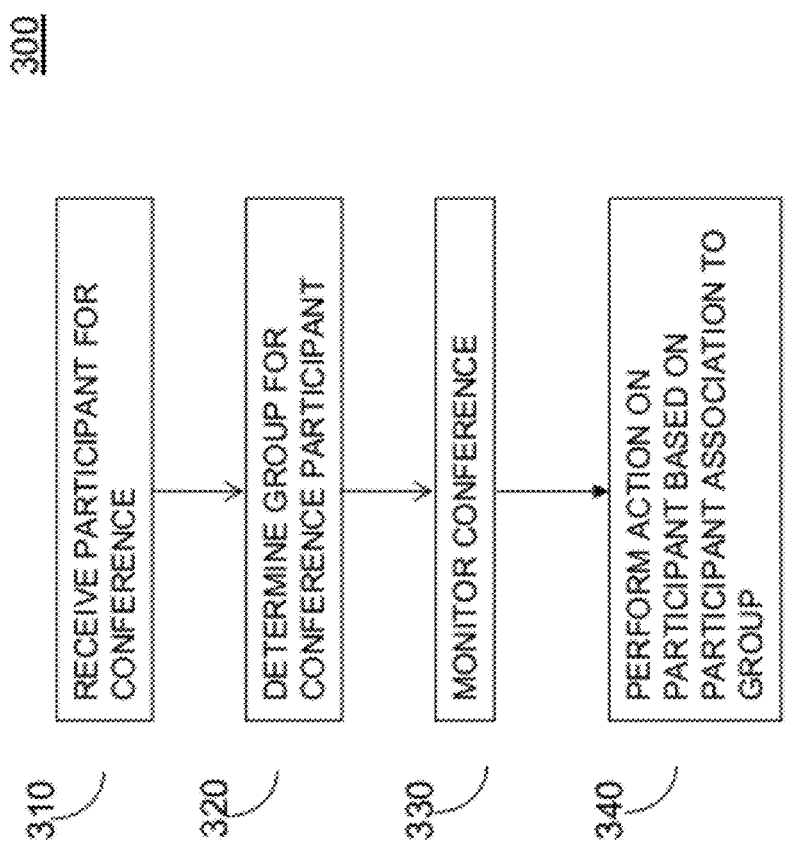
FIG. 3 is a flow diagram of an embodiment of a method for administering a multiparty conference.

FIG. 3 is a flow diagram of an embodiment of a method 300 for administering a multiparty conference. The method 300 can be implemented, for example, in the conference management system 100 described above. Accordingly, in describing the method 300, reference is also made to FIGS. 1 and 2.

The method 300 commences with the creation of a conference. A conference administrator 11 can create the conference by configuring the conference management system 100 to receive one or more participants (step 310). The participants can be received by establishing an electronic communication with the conference, for example, placing a telephone call to the conference management system.

The participants can be received by joining the conference, for example, by dialing a conference number or entering an internet URL to access the conference management system 100, or by the conference management system 100 initiating a connection with each participant, for example, automatically dialing the participant's client device 20.

A group can be determined (step 320) for each participant. Participant groups can be determined by the conference administrator 11 before a conference starts or during a conference. The conference administrator 11 can determine which groups to be included in a given conference by selecting predefined groups from a list, for example, provided in a drop-down menu.

The conference administrator 11 can create groups, and populate the groups with conference participants as they join the conference. The predefined groups can be created according to a canonical format for communicating with an external information source, for example, information directory server 32 or social network 34, which may include information related to the group, for example, information on participants who are members of the group. Thus, a conference participant's association with a predefined conference group can be verified by querying an information source. In other cases, no verification is required. If the query identifies a group in the information source that matches the conference group predefined by the conference administrator 11, the participant can be automatically added to the conference group created by the conference administrator 11.

Instead of, or in addition to, predefined groups, other groups can be retrieved from an external information source, and presented to the conference administrator 11, either before a conference start, or during a conference. For example, if a query determines that a participant belongs to a school alumni group identified in the social network 34, then the school alumni group can be added to a current list of groups in the conference management system 100. The group determiner 204 can also determine whether other conference participants belong to the retrieved group, e.g., the school alumni group, and add these participants to the retrieved group.

As described above, the conference management system 100 can perform a query of an external information source to determine one or more groups to which a conference participant can be associated. These groups can be determined using the conference participant's identifier, e.g., phone number, email address, etc. The identifier can be provided when the participant joins the conference, for example, by providing a username and/or password, or other identifier such as an email address, phone number, identification number, etc.

For example, a participant's email address can be stored in an LDAP directory, as well as information related to the participant's association with an employee group, for example, a group entitled "Vice Presidents." When the participant joins a conference, a query can be made based on the participant's email address. If the participant's email address is found in an LDAP directory along with a group association entitled "Vice Presidents," this information can be retrieved from the LDAP directory and presented to the conference administrator 11. Other participants can be subsequently added to the group entitled "Vice Presidents" after verifying their association with this group.

The conference administrator 11 can receive this information dynamically. In the previous example, the conference management system can be configured so that the conference administrator 11 does not retrieve the LDAP search results until a vice president joins a conference; the vice president's entry to the conference can prompt the search query for groups associated with the vice president.

When a participant joins a conference, a determination can first be made as to whether the participant should be added to any current list of groups in the conference management system 100. If there is no association between the current list of groups and the participant, a query can then be made to determine whether the participant is associated with a group not identified in the conference management system 100.

Some participants may belong to several different groups, which can be difficult for the conference administrator 11 to manage. For example, the automatic population of participants into groups by the conference management system 100 can result in a participant belonging to each group in a given conference. In this example, when a moderator performs an action to mute one group of participants over another, this participant would be muted regardless of which group the moderator chooses to mute. In another example, a participant can belong to several different groups identified in an information source directory, and each group can be retrieved from the directory and added to a list of groups in the conference management system 100. However, the conference administrator 11 may be unaware of or uninterested in many of these groups. The issues described in these examples can be overcome by creating a conference profile that reduces the groups to only those groups of interest to the conference administrator 11.

As described above, a conference administrator can create a conference profile to comply with established policies, for example, to mute all participants during a conference except for vice presidents. A conference profile can also be created to eliminate chatter or conflict arising when two or more participants speak at the same time. In the previous example, when a vice president and another participant speak at the same time during the conference, the other participant can be muted, since the conference profile is configured to establish that the group to which the vice president belongs has a higher priority to speak than the group to which the other participant belongs. In another example, a conference profile can be created to comply with a policy of preventing certain groups of participants from joining a conference due to lack of resources, for example, insufficient conference connections, while reserving sufficient resources for preferred groups of participants.

A conference profile can be created for an unattended conference, which includes a set of default actions to be performed during the conference according to group membership. For example, a conference profile can be created to permit a member of the group entitled "vice presidents" to speak during a conference without interruption by instructing the conference management bridge 100 to automatically mute the other participants when a vice president speaks. In another example, a conference profile can indicate that an audio tone is played when a vice president enters or leaves a conference, and that no audio tone is played when other participants, i.e., participants other than vice presidents, enter or leave the conference.

A group may also be determined, and participants added to the group, only after a participant initiates an event, for example, only when the participant speaks during a conference. In this case, when the participant speaks, a query can be made to determine whether the participant belongs to an existing group, for example, a group identified by a moderator or a predefined group located in an external information source. Once a group is identified, the participant is assigned to a group, and actions can be directed to the group to which the participant is assigned, or directed to the participant based on the participant's association with the group. In the previous example, if the speaking participant is determined to belong to a low priority group, the speaking participant can be muted when another participant associated with a high priority group speaks during the conference.

The conference (step 330) can be monitored to determine whether an action is required on a conference participant or a group. The conference administrator 11 can monitor the conference. Alternatively, the conference can be monitored automatically by the conference management system 100 without conference administrator intervention.

An action can be performed (step 340) either on the participant or the group to which the participant belongs based on group membership. Such actions can be readily performed manually by the conference administrator 11 or automatically by the conference management system 10, and are well-known to known to those of ordinary skill in the art, such as muting participants, responding to participant requests, creating sub-conferences, dropping participants when resources are low, etc.

Figure 4:
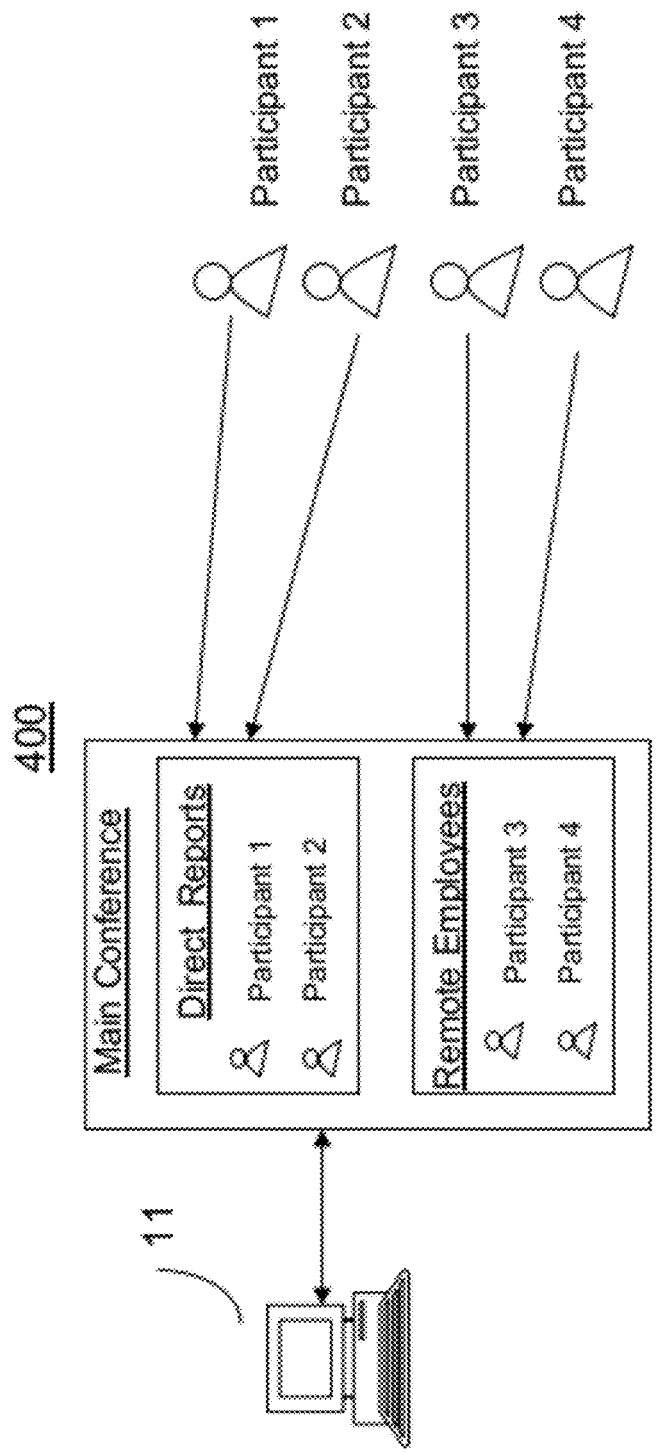
FIG. 4 is a diagram illustrating an embodiment of a multiparty conference configuration.

An example of conference administration will now be described with reference to FIGS. 4 and 5. As shown in FIG. 4, Participant 1 through Participant 4 can join a conference configured in a conference management system 400, referred to as a main conference. As Participant 1 through Participant 4 are each added, a determination is made by a conference administrator 11 as to which of two groups, Direct Reports and Remote Employees, each participant should be added. Group information such as group names and participant information such as participant names can be displayed on the administrator's display device, e.g., a computer terminal, so that a conference administrator 11 can perform actions related to Participants 1 through 4 based on their group associations.

Figure 5:
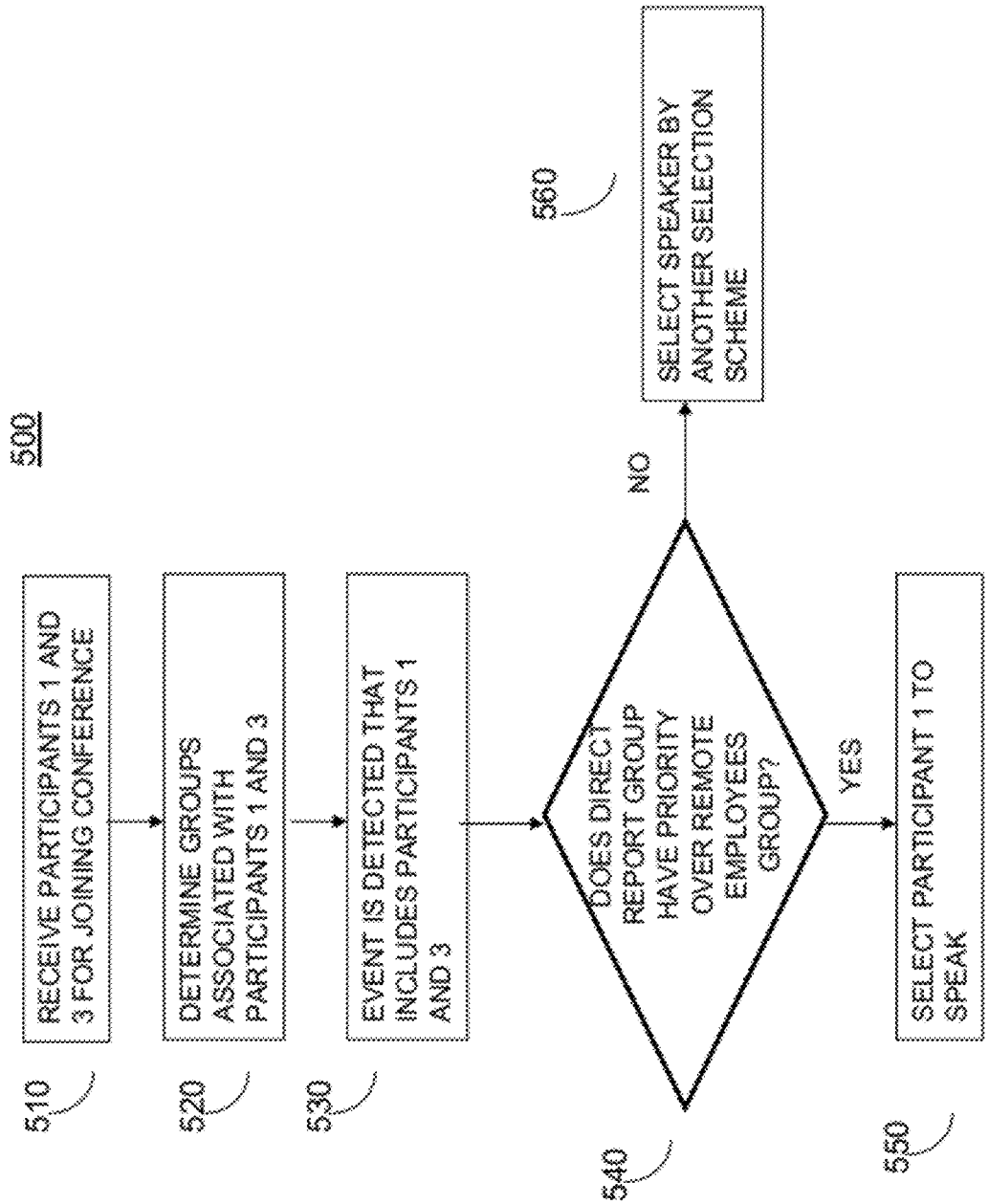
FIG. 5 is a flow diagram of an embodiment of a method of managing the multiparty conference shown in FIG. 4.

FIG. 5 is a flow diagram of a method 500 of managing the main conference shown in FIG. 4.

Method 500 begins by Participants 1 and 3 joining the main conference (step 510), for example, by logging into the main conference, or by the conference management system 400 placing outbound calls to Participant 1 and Participant 3. Participants 2 and 4 can also join the main conference in the same manner as Participants 1 and 3.

Group associations with each participant are determined (step 520). In particular, Participants 1 and 2 are determined to belong to the Direct Reports group and Participants 3 and 4 are determined to belong to the Remote Employees group according to group determination approaches described herein.

An event is detected (step 530) that includes Participants 1 and 3. For example, Participants 1 and 3 speak at the same time during the main conference.

A determination is made (step 540) as to whether the Direct Reports group has a higher priority status that the Remote Employees group, for example, by a conference profile that complies with a corporate policy establishing that a corporate executive's direct reports receive priority with regard to speaking during a conference call. For example, a conference profile can be created, which establishes that conference participants associated with the Direct Reports group have a higher priority with regard to speaking than those conference participants associated with the Remote Employees group.

Accordingly, if the Direct Reports group has a higher priority status than the Remote Employees group (step 540), then Participant 1 is selected to speak (step 550) based on Participant's 1 association with the Direct Reports group, and Participants 3 and 4 are muted while Participant 1 speaks. Otherwise, as shown in step 560, either Participant 1 or Participant 3 can be selected to speak according to another selection scheme, for example, using loudness as a determining factor in selecting the speaker.

Figure 6:
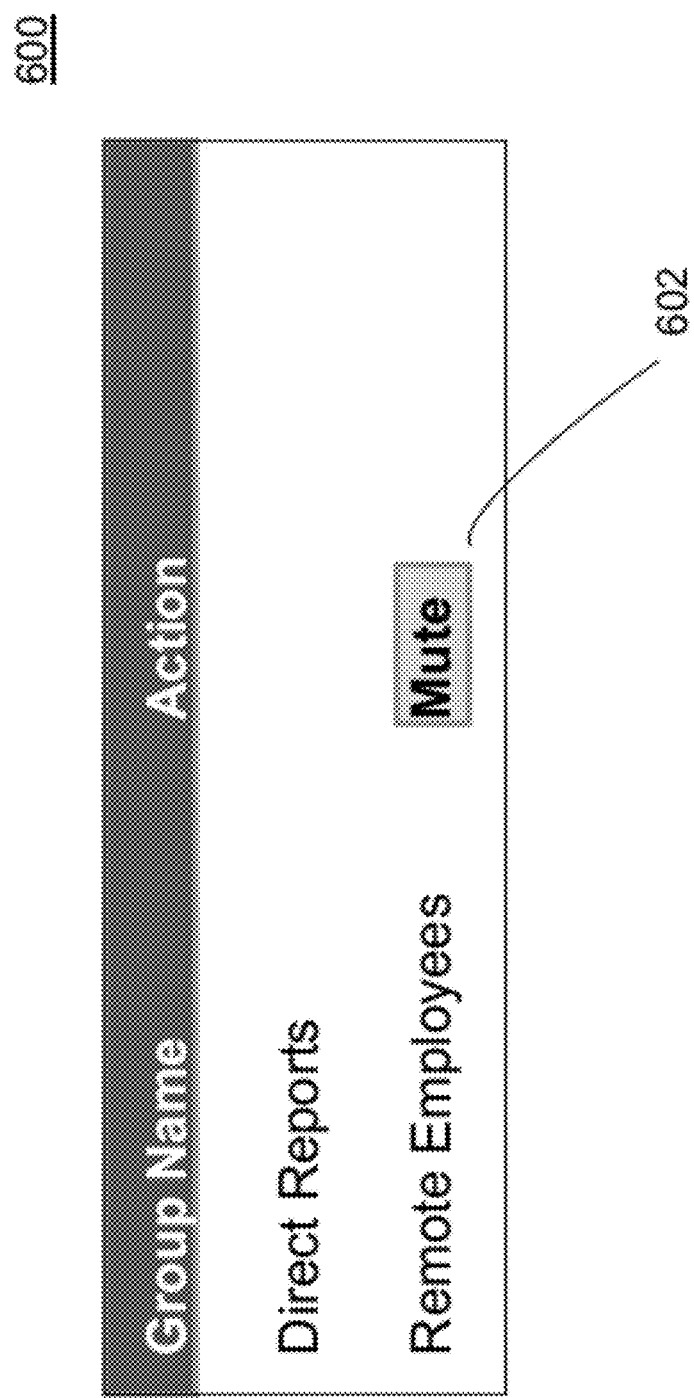
FIG. 6 illustrates an embodiment of a user interface used by a conference moderator for performing an action against a group of conference participants.

FIG. 6 illustrates a user interface 600 used by a conference moderator for performing an action against a group. In the illustrated example, a list of groups, i.e., Direct Reports and Remote Employees, is displayed to the conference moderator, for example, on the moderator's computer screen. Each group includes one or more conference participants. The conference moderator can configure the user interface 600 to display each participant under a corresponding group. Alternatively, as shown in FIG. 6, the conference moderator can configure the user interface to display groups only, and perform actions on the displayed groups. For example, the conference moderator can execute a mute command to the Remote Employees group, whereby all conference participants in the Remote Employees group are muted.

Figure 7:
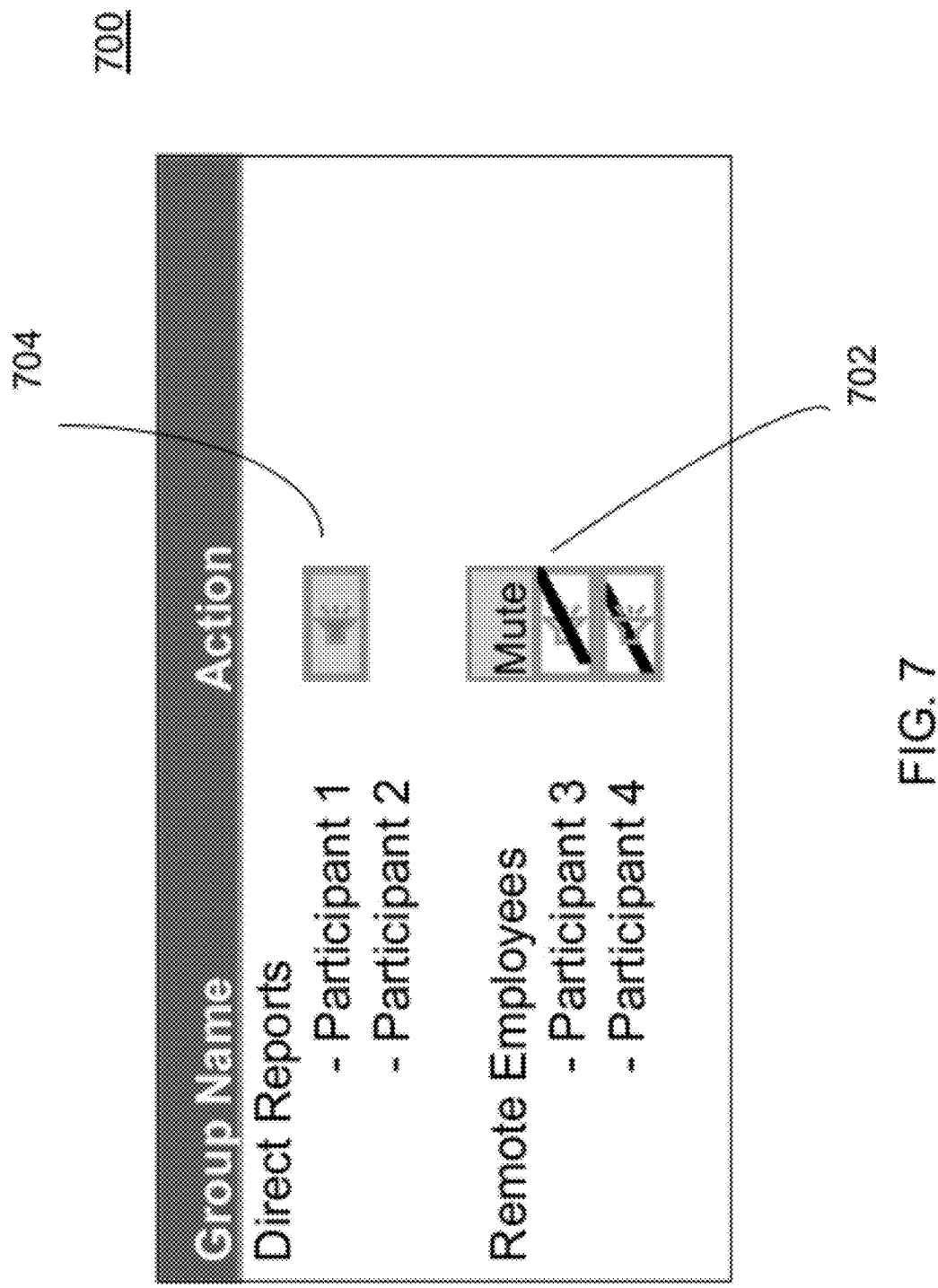
FIG. 7 illustrates an embodiment of a user interface used by a conference moderator for performing an action against conference participants based on group participation.

FIG. 7 illustrates a user interface 700 used by a conference administrator for performing an action against conference participants based on group participation. During a conference call, the conference administrator can select Participant 1 to speak by executing an audio activation command 704. In doing so, the conference administrator can also execute a mute command 702 against the Remote Employees group, whereby each participant in the Remote Employees group, i.e., Participants 3 and 4, are muted while Participant 1 speaks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method of administering an online conference comprising:
   receiving by a conference management system an electronic communication from each of a plurality of conference participants;
   determining a plurality of groups for the conference participants;
   associating a first conference participant with a first group of the plurality of groups;
   associating least one other conference participant with the first group;
   associating a second conference participant with a second group of the plurality of groups;
   performing an action on the first conference participant based on either the first conference participant's association with the first group or based on the group, the action including distinguishing the first group associated with the first conference participant from the second group to which the second conference participant is associated by selecting the first group to which the action is to be applied from the plurality of groups; and
   receiving a signal from the conference management system to select only the first conference participant of the first group and not the at least one other conference participant of the first group to perform the action over the second conference participant based on the first conference participant's association with the first group as distinguished from the second group to which the second participant is associated.

2. The computer-implemented method of claim 1, wherein the conference is monitored by a conference administrator.

3. The computer-implemented method of claim 1, wherein the conference is monitored by the conference management system when the conference is configured as an unattended conference.

4. The computer-implemented method of claim 1, wherein the group is determined by a conference administrator.

5. The computer-implemented method of claim 1, wherein the group is determined from an external information source.

6. The computer-implemented method of claim 5, wherein the external information source is an information directory.

7. The computer-implemented method of claim 6, wherein the external information source is a social network.

8. The computer-implemented method of claim 1, wherein performing the action includes performing the action on all conference participants associated with the group.

9. The computer-implemented method of claim 8, wherein performing the action includes muting all participants in the group.

10. The computer-implemented method of claim 1, further comprising:
   determining a first group associated with a first conference participant and a second group associated with a second conference participant, wherein the first group has a higher priority status than the second group;
   detecting an event that includes the first and second conference participants; and
   performing an action on the first conference participant based on an association with the first group having the higher priority status.

11. A computer-implemented method of administering an online conference comprising:
   receiving by a conference management system an electronic communication from a first conference participant and a second conference participant;
   determining a first group associated with the first conference participant and at least one other conference participant and a second group associated with the second conference participant, wherein the first group has a higher priority status than the second group;
   detecting an event that includes the first and second conference participants; and
   performing an action on the first conference participant based on an association with the first group having the higher priority status, the action including distinguishing the first group associated with the first conference participant from the second group to which the second conference participant is associated by selecting the first group to which the action is to be applied from the plurality of groups;
   receiving a signal from the conference management system to select only the first conference participant of the first group and not the at least one other conference participant of the first group to perform the action over the second conference participant based on the first conference participant's association with the first group as distinguished from the second group to which the second participant is associated.

12. The computer-implemented method of claim 11 further comprising monitoring the online conference by a conference administrator.

13. The computer-implemented method of claim 12, wherein the conference administrator performs the action on the first conference participant based on the association with the first group.

14. The computer-implemented method of claim 11, wherein at least one of the first group and the second group is determined from an external information source.

* * * * *